(12) United States Patent
Goering et al.

(10) Patent No.: US 10,988,173 B2
(45) Date of Patent: Apr. 27, 2021

(54) METHOD AND DEVICE FOR OPERATING A TRANSPORTATION VEHICLE FUNCTION

(71) Applicant: VOLKSWAGEN AKTIENGESELLSCHAFT, Wolfsburg (DE)

(72) Inventors: Lars Goering, Peine (DE); Tobias Rüger, Braunschweig (DE); Timo Dobberphul, Braunschweig (DE)

(73) Assignee: Volkswagen Aktiengesellschaft

(*) Notice: Subject to any disclaimer, the term of this patent is extended or adjusted under 35 U.S.C. 154(b) by 103 days.

(21) Appl. No.: 16/174,431

(22) Filed: Oct. 30, 2018

(65) Prior Publication Data
US 2019/0126981 A1 May 2, 2019

(30) Foreign Application Priority Data
Nov. 1, 2017 (DE) ...................... 10 2017 219 467.7

(51) Int. Cl.
*B62D 15/02* (2006.01)
*B62D 6/00* (2006.01)
(Continued)

(52) U.S. Cl.
CPC ......... *B62D 15/025* (2013.01); *B62D 5/0457* (2013.01); *B62D 5/0463* (2013.01);
(Continued)

(58) Field of Classification Search
CPC .. B62D 15/025; B62D 5/0457; B62D 5/0463; B62D 6/00; B62D 6/08; G05D 1/021
See application file for complete search history.

(56) References Cited

U.S. PATENT DOCUMENTS 6,219,603 B1 * 4/2001 Yamamoto ............ B62D 5/008
180/444
6,368,250 B1 * 4/2002 Marten ................. B60T 8/1755
192/103 C
(Continued)

FOREIGN PATENT DOCUMENTS

DE 19831249 A1 3/2000
DE 10018191 A1 10/2000
(Continued)

OTHER PUBLICATIONS

Schaper et al., DE 102012002771, Aug. 14, 2013 (machine translation).*
(Continued)

*Primary Examiner* — Kevin P Mahne
(74) *Attorney, Agent, or Firm* — Barnes & Thornburg LLP

(57) ABSTRACT

A method for operating a transportation vehicle function based on a natural frequency and/or a moment of inertia of a steering wheel arrangement in a steering system including prespecifying an electromotive steering intervention to move the steering system by providing a steering intervention force or a steering intervention torque; ascertaining a natural frequency and/or a moment of inertia of the steering wheel arrangement depending on the response of the steering wheel arrangement based on the electromotive steering intervention; and operating the transportation vehicle function based on the ascertained natural frequency and/or the ascertained moment of inertia of the steering wheel arrangement.

23 Claims, 2 Drawing Sheets

(51) Int. Cl.
　　　*B05D 1/02*　　　(2006.01)
　　　*B62D 6/08*　　　(2006.01)
　　　*B62D 5/04*　　　(2006.01)
　　　*G05D 1/02*　　　(2020.01)

(52) U.S. Cl.
　　　CPC .............. *B62D 6/00* (2013.01); *B62D 6/08* (2013.01); *G05D 1/021* (2013.01)

(56) References Cited

U.S. PATENT DOCUMENTS

| | | | | |
|---|---|---|---|---|
| 6,389,342 | B1* | 5/2002 | Kanda | B62D 5/006 180/443 |
| 6,564,637 | B1* | 5/2003 | Schalk | G01C 19/5614 73/504.12 |
| 8,632,096 | B1* | 1/2014 | Quinn | F16F 9/53 280/771 |
| 2007/0107979 | A1* | 5/2007 | Limpibunterng | B62D 5/008 180/446 |
| 2008/0040002 | A1* | 2/2008 | Galkoswki | B62D 6/003 701/43 |
| 2011/0098890 | A1* | 4/2011 | Lee | B62D 1/286 701/42 |
| 2013/0317699 | A1* | 11/2013 | Urhahne | B62D 15/025 701/41 |
| 2017/0029021 | A1* | 2/2017 | Lee | G05D 1/0088 |
| 2018/0154936 | A1* | 6/2018 | Yamasaki | B62D 5/0484 |

FOREIGN PATENT DOCUMENTS

| | | |
|---|---|---|
| DE | 102006038692 A1 | 2/2008 |
| DE | 102011106900 A1 | 1/2013 |
| DE | 102012002771 A1 | 8/2013 |
| DE | 102013209459 A1 | 11/2013 |
| DE | 102013218246 A1 | 4/2014 |
| DE | 102016114161 A1 | 2/2017 |
| DE | 112004002251 B4 | 2/2017 |
| EP | 1123485 A1 | 8/2001 |
| WO | 2016208399 A1 | 12/2016 |

OTHER PUBLICATIONS

Search Report for German Patent Application No. 10 2017 219 467.7; dated Jul. 2, 2018.

* cited by examiner

METHOD AND DEVICE FOR OPERATING A TRANSPORTATION VEHICLE FUNCTION

PRIORITY CLAIM

This patent application claims priority to German Patent Application No. 10 2017 219 467.7, filed 1 Nov. 2017, the disclosure of which is incorporated herein by reference in its entirety.

SUMMARY

Illustrative embodiments relate to transportation vehicles, in particular, transportation vehicles which are equipped with autonomous driving functions. Illustrative embodiments further relate to methods for ascertaining parameters of steering systems which are necessary for performing autonomous driving functions with steering interventions.

BRIEF DESCRIPTION OF THE DRAWINGS

Disclosed embodiments will be explained in more detail below with reference to the appended drawings, in which.

DETAILED DESCRIPTION

Figure 1:
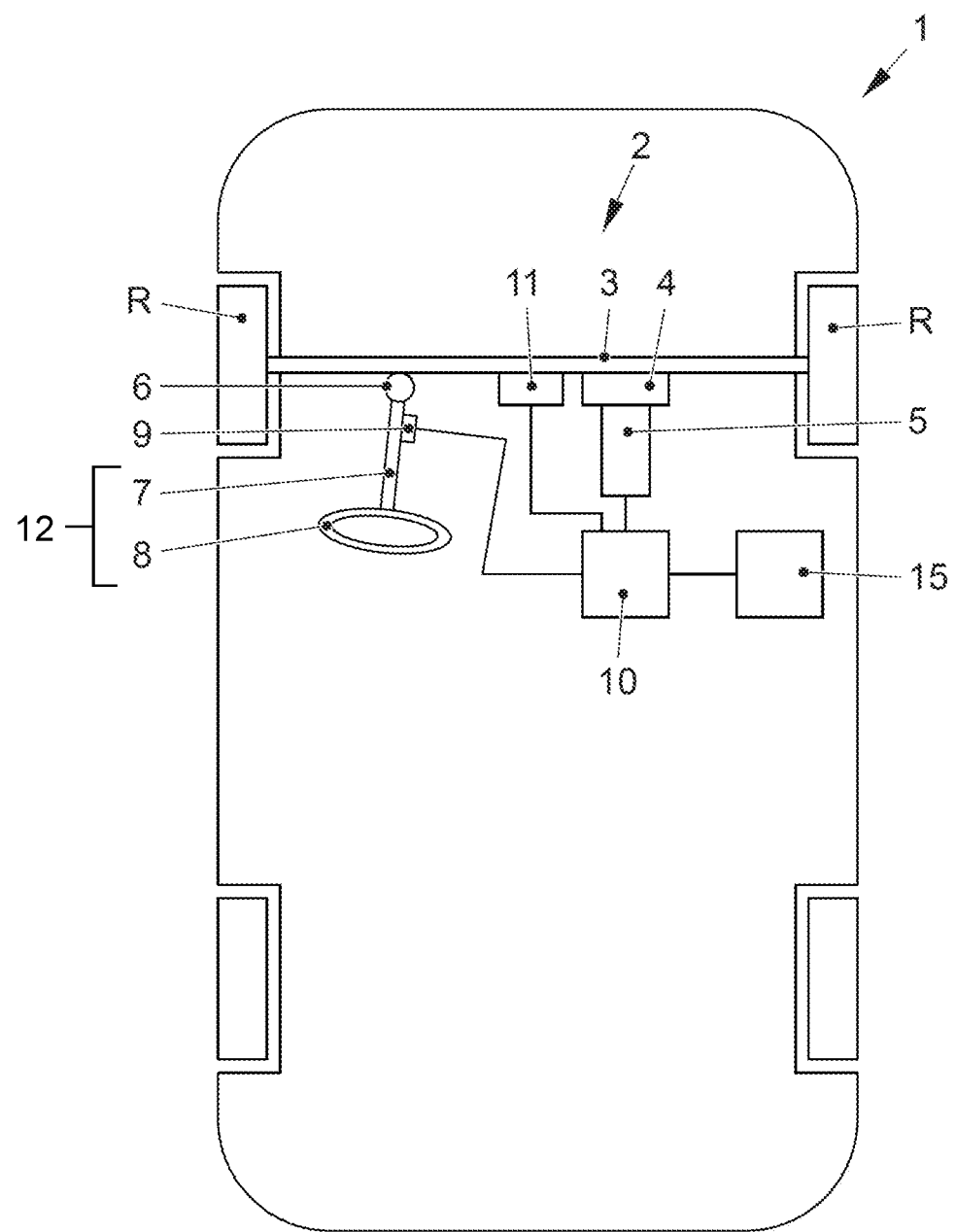
FIG. 1 shows a schematic illustration of a transportation vehicle comprising a steering system.

Driver assistance functions in transportation vehicles are increasingly actively intervening in the steering system. At present, the majority of steering interventions are admittedly performed only to assist the driver in steering the transportation vehicle, but, in the case of highly automated driving functions, steering of the transportation vehicle can also be taken over completely by transportation vehicle functions. As a result, it is becoming necessary to also implement dynamic steering interventions without the driver having to intervene.

However, without the damping influence of a steering wheel which is firmly held by the driver, action on the steering rack, the steering shaft or other components of the steering system by way of an electromechanical steering intervention for implementing a desired steering movement lead to the possibility of clearly visible vibrations occurring at the steering wheel, which vibrations can lead to unstable driving behavior and, in a worst-case scenario, to the transportation vehicle swerving during driving. It is critical that a steering wheel arrangement comprising a steering wheel and a steering shaft forms a spring oscillator, the damping of which is critically dependent on operation of the steering wheel by the hands of the driver.

Preventing oscillation of the steering wheel arrangement can be achieved by suitable design of a position control arrangement for actuating the electromechanical steering drive. However, effective vibration suppression requires knowledge of the torsion bar stiffness and the moment of inertia of the steering wheel arrangement, these factors generally being transportation vehicle-specific since, in particular, transportation vehicles of the same type can be equipped with different steering wheel configurations.

DE 10 2006 038 692 A1 provides a method for steering angle correction in a power-assisted steering system for a transportation vehicle, wherein a correction steering torque is additively superimposed on an assistance torque by an electric motor and is introduced into a steering line for influencing a wheel steering angle. The correction steering torque is ascertained depending on moments of mass inertia and characteristic friction values of other components in the steering line. As an alternative, the steering angle correction can be carried out using single- or multidimensional characteristic curves which depend on the moments of mass inertia and characteristic friction values.

DE 10 2013 218 246 A1 discloses a method for damping torsional vibration of a steering wheel, wherein the damping effect can be adjusted using control signals which are selected, inter alia, depending on a moment of inertia of the steering wheel.

In the prior art specified above, the moment of inertia of the steering wheel arrangement comprising the steering wheel and/or the steering shaft is prespecified as a constant value and is ascertained empirically, for example, during start-up of the transportation vehicle. Owing to the different possible ways that the driver can act on the steering wheel arrangement and also the possibility of the driver not firmly holding the steering wheel during autonomous driving operation, significantly variable moments of inertia of the steering wheel arrangement can arise. Since conventional position control arrangements for steering systems take into account only a fixed moment of inertia, this can lead to a steering intervention overshooting in an unfavorable instance.

Disclosed embodiments provide a possible way of determining the moment of inertia of the steering wheel arrangement comprising the steering wheel and the steering shaft and optionally of taking the moment of inertia into account in a steering position control operation.

This is achieved by the method for operating a transportation vehicle function based on a moment of inertia in a steering system and also by the apparatus and a transportation vehicle system.

A first disclosed embodiments provides a method for operating a transportation vehicle function based on a natural frequency and/or a moment of inertia of a steering wheel arrangement in a steering system, comprising the following operations:

prespecifying an electromotive steering intervention to move the steering system by providing a steering intervention force or a steering intervention torque;

ascertaining a natural frequency and/or a moment of inertia of the steering wheel arrangement depending on the response of the steering wheel arrangement on the basis of the electromotive steering intervention;

operating the transportation vehicle function based on the ascertained natural frequency and/or the ascertained moment of inertia of the steering wheel arrangement.

It is necessary to implement the prespecification of steering angles or steering torques as accurately as possible for the purpose of carrying out transportation vehicle functions which intervene in the steering of a transportation vehicle or for the purpose of executing autonomous driving functions which automatically take over the steering of a transportation vehicle for a prespecified period of time. In the case of a steering position control operation which corresponds to control of steering angles, prespecifying a setpoint steering position involves actuating a steering drive such that it assumes or approaches the steering position in question as quickly as possible taking into consideration respective constraints. At present, it is not possible, given prespecified high dynamics, to design a steering position control operation with a sufficient control quality factor such that overshooting is avoided in the event of varying moments of inertia too. When the driver lets go of the steering wheel, the moment of inertia of the steering wheel arrangement of the steering system is considerably reduced, and therefore the steering wheel arrangement tends to overshoot in the event of automatic steering interventions. Therefore, for the purpose of carrying out the abovementioned transportation vehicle functions, it is necessary to take into account the actual moment of inertia of the steering wheel arrangement in an appropriate manner for the purpose of actuating the steering system or for the purpose of carrying out a steering intervention by transportation vehicle functions or an autonomous driving function.

The interventions in the majority of transportation vehicle functions are restricted to brief steering recommendations which are indicated to the driver by a changing manual torque on the steering wheel. In this case, the driver generally keeps his hands on the steering wheel for the entire duration of the steering intervention. Owing to the resulting damping of movements of the steering wheel arrangement, the firmly held steering wheel arrangement does not yet have to be regarded as a vibratory mass. In contrast, there is provision for the driver not to keep his hands on the steering wheel in the case of autonomous driving functions which are intended to execute a steering operation independently, so that the damping of the steering wheel arrangement is considerably lower.

In the development of implementing ever more dynamic steering position control operations, the freely vibrating steering wheel arrangement is accompanied by an unknown variable which has to be taken into account in the steering position control operation since, otherwise, the steering position control can become unstable or the desired dynamics may not be reached. Therefore, the above method allows the moments of inertia of the steering arrangement comprising the steering wheel and the steering shaft to be determined in a transportation vehicle-specific manner to be able to take this information into account in the steering position control operation.

To this end, the above method provides for determining a moment of inertia at prespecified times, for example, when starting up the transportation vehicle, when replacing the steering shaft and/or steering wheel and the like or at regular intervals. To this end, an electromotive steering intervention as an intervention torque or an intervention torque profile can be impressed into the steering by the steering drive of the steering system, this leading to mechanical adjustment of the steering system. The variables angular velocity and angular acceleration of the steering drive or the variables of the steering system that are dependent on them and also the steering torque which is produced by the mass inertia of the steering wheel arrangement comprising the steering wheel and the steering shaft and which can be measured using a manual steering torque sensor on the steering shaft are determined for this purpose. This allows the mass inertia of the steering wheel arrangement to be determined. The mass inertia which is determined in this way can be taken into account below for executing transportation vehicle functions which effect steering interventions and for executing autonomous steering functions.

In this way, it is possible to ascertain transportation vehicle-specific configurations of the steering shaft and the steering wheel, so that they can be taken into account for a transportation vehicle function and an autonomous steering function. As a result, empirical determination of the moment of inertia of the steering wheel arrangement, in particular, outside the transportation vehicle, which is complicated, can be avoided and, secondly, the actual moment of inertia can be determined more precisely.

Furthermore, a steering position control operation can be carried out based on one or more control parameters, wherein the one control parameter or the plurality of control parameters is/are assigned to the ascertained natural frequency and the moment of inertia, or wherein the one control parameter or the plurality of control parameters is/are calculated based on the natural frequency and/or the moment of inertia.

During the steering position control operation, at least one of the natural frequencies of the steering wheel arrangement can be masked out, in particular, by a deadband filter.

There may be provision for elastic tensioning of the steering wheel arrangement on the basis of the steering intervention force or the steering intervention torque to be measured and to be determined, in particular, by the profile of a steering wheel torque.

A corresponding profile of the steering wheel torque can be measured by a manual steering torque sensor on the steering wheel arrangement.

According to at least one disclosed embodiment, the electromotive steering intervention can be prespecified as a step profile of the steering intervention force or of the steering intervention torque or as a periodic oscillation of the steering intervention force or of the steering intervention torque.

Furthermore, the natural frequency can be determined by excitation with sinusoidal steering interventions at different excitation frequencies and by selecting as the natural frequency that excitation frequency at which the ratio of the movement amplitude on the steering wheel to the movement amplitude on the pinion is at a maximum.

There may be provision for the moment of inertia of the steering wheel to be determined based on a torque, which is introduced by the steering intervention, on the steering wheel arrangement and a resulting angular acceleration of the steering wheel arrangement.

According to at least one disclosed embodiment, for the purpose of ascertaining the natural frequency and/or the moment of inertia, a sinusoidal excitation or a step excitation can be introduced as the steering intervention.

There may be provision for ascertaining the natural frequency and/or the moment of inertia of the steering wheel arrangement to be carried out only when the steering wheel arrangement is not acted on by the hands of the driver.

The steering wheel arrangement can be established as not being acted on by the hands of the driver as a result of a torque balance being created at the steering wheel arrangement, wherein a steering wheel which is firmly held is identified if it is established that there is a differential torque.

The transportation vehicle function can comprise a driver assistance function, which provides for a steering intervention, or an autonomous driving function, which provides for automatic steering.

A further disclosed embodiment provides for an apparatus for operating a transportation vehicle function based on a natural frequency or a moment of inertia of a steering wheel arrangement in a steering system, comprising the following operations:

prespecifying an electromotive steering intervention to move the steering system by providing a steering intervention force or a steering intervention torque;

ascertaining a natural frequency and/or a moment of inertia of the steering wheel arrangement depending on the response of the steering wheel arrangement on the basis of the electromotive steering intervention;

operating the transportation vehicle function based on the ascertained natural frequency and/or the ascertained moment of inertia of the steering wheel arrangement.

A further disclosed embodiment provides for a steering system comprising a steering wheel arrangement and comprising the above apparatus.

FIG. 1 shows a schematic illustration of a transportation vehicle 1 comprising a steering system 2. The steering system 2 serves to adjust a steering angle of steered wheels R. The steered wheels R can be oriented by a steering mechanism 3, which can comprise a steering rack, in accordance with a steering angle for steering the transportation vehicle 1. The steering mechanism 3 can be coupled to a steering drive 5 by a coupling gear mechanism 4 to exert a steering intervention force on the steering rack of the steering mechanism 3. The steering drive 5 can be provided, for example, as an electromotive steering drive.

Furthermore, the steering mechanism 3 is coupled to a steering wheel arrangement 12 by a mechanical steering shaft coupling 6 (gear mechanism). The steering wheel arrangement 12 comprises a steering shaft 7 and a steering wheel 8 which is arranged at the end of the steering shaft 7 and by which a driver can exert a manual steering torque. The manual steering torque can be converted into a steering movement onto the steered wheels 2 by the steering mechanism 3. As an alternative, the steering drive 5 can also act on the steering shaft 7 by a corresponding coupling gear mechanism and provide, instead of a steering intervention force, a steering intervention torque as the steering intervention.

The steering shaft 7 can be provided with a manual steering torque sensor 9 to record a steering torque, which is exerted between the steering shaft coupling 6 and the steering wheel 8, and to provide corresponding information to a steering control device 10 during conventional operation.

The process of providing the steering intervention is likewise prespecified in a suitable manner by the steering control device 10. Furthermore, a steering rack position can be recorded using a steering rack position sensor 11, and corresponding information can be provided to the steering control device 10.

Furthermore, the steering control device 10 can be connected to a transportation vehicle control device 15 in which transportation vehicle functions, such as driver assistance functions and/or autonomous driving functions for example, can be realized. Accordingly, steering intervention prespecifications or setpoint prespecifications for a steering position control operation are provided to the steering control device 10.

A steering position control operation, which can be configured as a PID control operation, for example, is generally carried out in the steering control device 10. For the purpose of carrying out a steering position control operation in the steering control device 10, it is necessary, particularly given increasing dynamics of the steering position control operation, to know a natural frequency and/or the moment of inertia of the steering system 2, in particular, the natural frequency of the steering wheel arrangement 12 and/or of the steering system 2 and the moment of inertia of a steering wheel arrangement 12 comprising the steering wheel 8 and the steering shaft 7, and to adapt the control parameters of the steering position control operation accordingly. The control parameters are defined such that, given a prespecified steering position control operation and a known moment of inertia, vibration of the steering wheel 8 is avoided, even in the event of high actual/setpoint disparities. For example, the control parameters can be assigned to the natural frequency and/or the moment of inertia, for example, by a lookup table.

When a steering wheel 8 is firmly held by the driver, the damping of a steering wheel movement is generally so high that a varying inertia of the steering wheel arrangement 12 does not necessarily have to be taken into account in the steering position control operation. However, this is critical in the case of transportation vehicle functions which intervene in the steering of the transportation vehicle 1 while the steering wheel 8 is not acted on by the hands of the driver, given accordingly dynamic design of the steering position control operation. In this case, on account of the considerably reduced moment of inertia, overshoots can occur in the case of a moment of inertia which has been taken into account incorrectly, it being possible for the overshoots to lead to an unstable steering behavior of the transportation vehicle 1.

Figure 2:
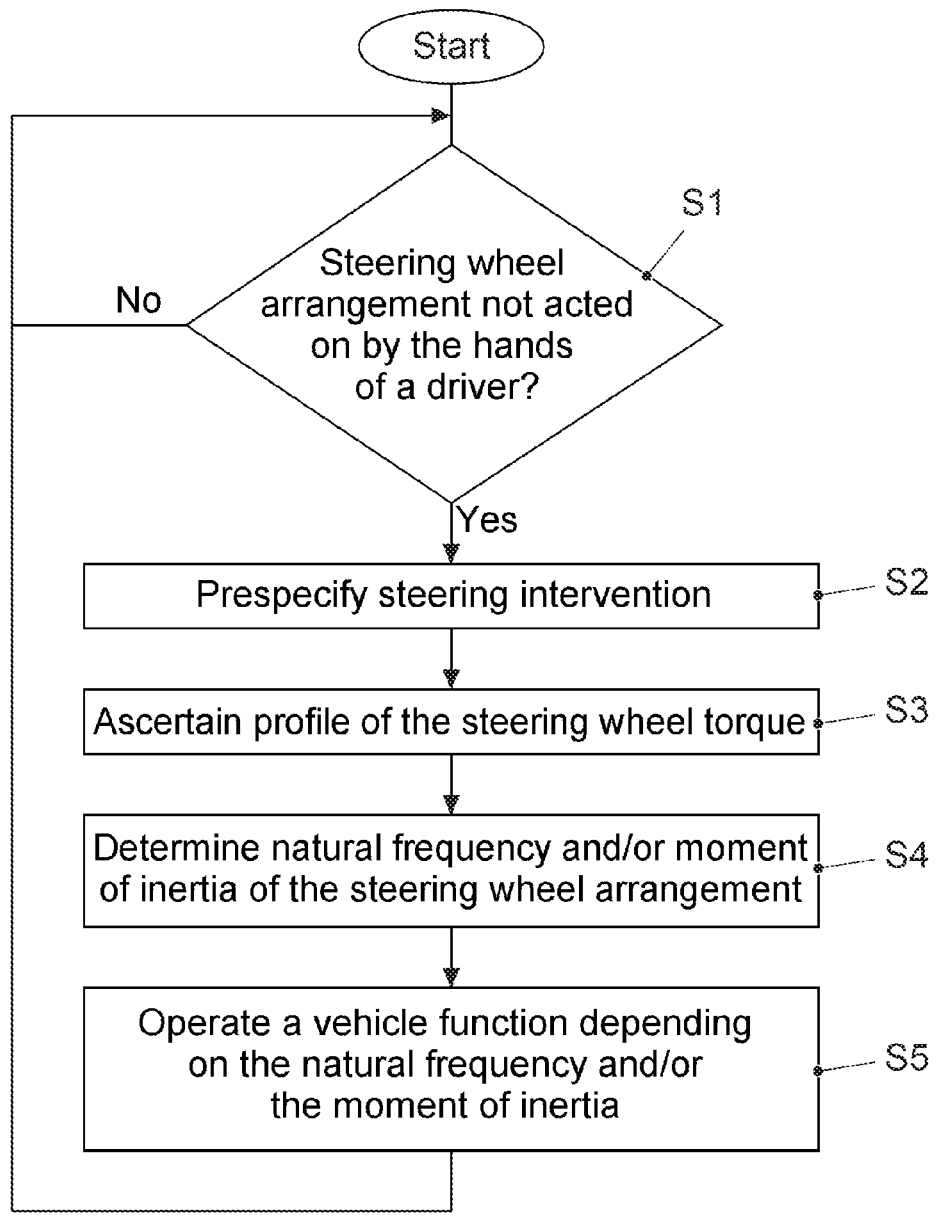
FIG. 2 shows a flowchart for illustrating a method for carrying out a transportation vehicle function.

Therefore, it is necessary to determine a moment of inertia for a steering wheel arrangement 12 in a transportation vehicle-specific manner and to take it into account in a suitable manner for steering interventions or steering angle prespecifications by the transportation vehicle control device 15 or to take it into account for the steering position control operation in the steering control device 10. To this end, a method is executed which is illustrated in the flowchart of FIG. 2.

In operation at S1, a check is initially performed using methods which are known per se to determine whether the steering wheel 8 is firmly held (hands on) or is not acted on (hands off), that is to say is freely rotating. To identify whether the driver is firmly holding the steering wheel 8, a hands-on identification operation can be carried out. To this end, a check is performed using a torque balance to determine whether a differential torque has acted on the steering wheel arrangement.

The torque balance is obtained from a sensor torque MSensor, which is measured using the manual steering torque sensor 9, and the moment of inertia $M=J_{Hands-off} \ddot{\varphi}$ of the steering wheel arrangement 12 which is not acted on. The angular acceleration $\ddot{\varphi}$ is taken as a basis for ascertaining whether the differential torque $$\Delta M = M_{sensor} - J_{Hands-off} \ddot{\varphi}$$

is not equal to 0. If it is established that the differential torque $\Delta M$ is not equal to 0, it is concluded that the steering wheel 8 is being firmly held by the driver.

If the steering wheel 8 is not acted on (alternative: yes), the method is continued with operation at S2, otherwise (alternative: no) the method returns to operation at S1. In that case, no moment of inertia determining operation is carried out, since a state of the steering wheel arrangement 12 in which damping which is as low as possible occurs has to be taken into account for a moment of inertia determining operation.

In operation at S2, an electromotive steering intervention is prespecified to move the steering system 2 by way of the steering intervention force or the steering intervention torque. This can be done by prespecifying a force or torque profile for the steering drive 5 by prespecifying a setpoint speed for the adjustment of the steering system 2 or the prespecification of a setpoint position to the steering position control operation in the steering control unit 10. The aim is to cause an acceleration behavior in the steering system 2 by way of which the steering wheel arrangement 12 is set or adjusted using the steering drive 5.

In operation at S3, a corresponding profile of a steering wheel torque is measured by the manual steering torque sensor 9, which profile results from the steering intervention of operation at S2. The steering wheel arrangement 12 is elastically tensioned as a result of the dynamic change in position of the steering mechanism 3. Since the steering wheel arrangement 12 is not acted on, and accordingly no countertorque is active, the steering wheel 8 is also accelerated accordingly and the steering shaft 12 relaxes. The steering wheel arrangement 12 begins to swing or to vibrate.

In operation at S4, the natural frequency and the moment of inertia can be ascertained by the manual steering torque sensor 9 on the basis of the measured profile of the steering wheel torque.

The natural frequency can be ascertained by virtue of the steering wheel arrangement 12 being assumed to be a single-mass oscillator. If the steering pinion is assumed to be stationary, the steering wheel 8, together with the steering shaft 7, can be considered to be a spring-mass oscillator. The spring-mass oscillator may be an oscillatory system which rotates about the steering axis.

When calculating the force equilibrium for a single-mass oscillator, the following differential equation is obtained.

$$m\ddot{x}(t)+d\dot{x}(t)+kx(t)=0$$

Solving the differential equation for d=0 gives a natural angular frequency $$\omega_0^2 = \frac{k}{m}.$$

This corresponds to a natural frequency of $$f = \frac{1}{2\pi}\sqrt{\frac{k}{m}},$$

where m corresponds to a mass, d corresponds to a damping constant, k corresponds to a spring constant x of a deflection, t corresponds to time, $\omega_0^2$ corresponds to the natural angular frequency of the undamped oscillation and f corresponds to a frequency.

Therefore, as input variables, J corresponds to the moment of inertia of the steering wheel arrangement 12, D corresponds to a directional torque which corresponds to a torsional stiffness of the torsion bar and φ corresponds to a deflection (rotation of the torsion bar).

If the torque equilibrium for the structure is calculated, the following differential equation is obtained.

$$J\ddot{\phi}(t)+D\phi(t)=0$$

Without damping, solving the equation ultimately again gives the term $$\omega_0^2 = \frac{D}{J}.$$

This corresponds to a natural frequency of $$= \frac{1}{2\pi}\sqrt{\frac{D}{J}}.$$

Furthermore, the following holds true:

$$M=J\cdot\ddot{\phi}$$

where J corresponds to the moment of inertia of the steering wheel arrangement 12, M corresponds to the torque and φ̈ corresponds to the angular acceleration.

The ratio of the excitation by the electromotive steering intervention to the current vibration of the steering wheel arrangement 12 at a point which is remote from the coupling point of the steering drive therefore allows the natural frequency of the steering system 2 to be ascertained. On the basis of a known steering shaft stiffness, the moment of inertia of the steering wheel arrangement 12 can be ascertained from the natural frequency.

Specifically, the steering angle and the angular velocity at the steering wheel are determined by the known sensor torque and the spring stiffness of the steering column and torsion bar for this purpose. The natural frequency can be ascertained by excitation with sinusoidal steering rack movements. Sinusoidal steering rack movements at different excitation frequencies can be created by the corresponding steering intervention. The ratios of the amplitudes on the steering wheel to the amplitudes on the pinion are compared with one another. When the natural frequency is reached, resonance occurs, and the ratio is at a maximum. Therefore, that excitation frequency at which a maximum ratio is obtained can be assumed to be the natural frequency. The natural frequency ascertained in this way can be converted into a moment of inertia using the abovementioned formula.

The moment of inertia of the steering wheel 8 can be ascertained from the acceleration behavior of the steering wheel. Any excitation of the steering rack results in rotation of the steering wheel arrangement 12. This rotation in turn applies a torque to the steering shaft 7 and the steering wheel 8. The torque leads to an angular acceleration. The ratio between the angular acceleration and the torque is defined by the formula M=J·φ̈ and therefore allows the moment of inertia to be calculated.

Any excitations, such as, for example, different sinusoidal excitations of the steering rack speed or an almost sudden change in the steering rack speed/steering rack acceleration, can be for the purpose of ascertaining the moment of inertia. In the event of continuous excitation, it is possible to carry out several measurements and to determine an average value for the moment of inertia.

The parameters ascertained in this way, specifically the natural frequency and the moment of inertia of the steering wheel arrangement 12, can then be used in operation at S5 for operating a transportation vehicle function in the steering control device 10. For example, the ascertained parameters can be taken into account for a steering position control operation.

This can be done by assigning control parameters of the steering position control operation to the ascertained natural frequency and moment of inertia, or the control parameters can be calculated based on the natural frequency and the moment of inertia.

Critical natural frequencies of the steering wheel 8 can be masked out for control to a steering rack position. To this end, the setpoint position can be changed by a filter operation such that the critical natural frequencies of the steering wheel 8 are severely damped (for example, by deadband filters). Therefore, oscillation of the steering wheel 8 is prevented in the event of pronounced accelerations in the steering system 2.

Furthermore, the steering position control operation to a setpoint position can be carried out with additional pilot control to compensate for vibration of the steering wheel 8. Braking and acceleration phases in the setpoint variable are identified in the position controller. For this purpose, the setpoint position can be provided with an additional offset in the steering position control operation. This offset corresponds to the angular offset which is required to accelerate the steering wheel 8 with the value calculated above using the torsional moment.

LIST OF REFERENCE SYMBOLS

1 Transportation vehicle
2 Steering system
3 Steering rack
4 Coupling gear mechanism
5 Steering intervention motor
6 Coupling
7 Steering shaft
8 Steering wheel
9 Manual steering torque sensor
10 Steering control device
11 Steering angle sensor
12 Steering wheel arrangement
15 Transportation vehicle control device
R Steered wheels

The invention claimed is:

1. A method for operating a transportation vehicle, the method comprising:
prespecifying an electromotive steering intervention to control the steering system by applying a steering intervention force or a steering intervention torque to a steering system of the transportation vehicle, wherein the steering system includes a steering wheel arrangement;
ascertaining, in response to ascertaining that the steering wheel arrangement is not being acted on by a driver, a natural frequency and/or a moment of inertia of the steering wheel arrangement based on a response of the steering wheel arrangement to the electromotive steering intervention; and
operating the transportation vehicle by adapting a control parameter of a steering position control operation applied to the steering system based on the ascertained natural frequency and/or the ascertained moment of inertia of the steering wheel arrangement, wherein the adapted control parameter is defined to prevent vibration of the steering wheel arrangement.

2. The method of claim 1, wherein a value of the adapted control parameter or the plurality of adapted control parameters is/are associated with, within a lookup table, a corresponding value of the ascertained natural frequency and/or the moment of inertia, or wherein the value of the adapted control parameter or the plurality of adapted control parameters is/are ascertained based on the corresponding value of the natural frequency and/or the moment of inertia.

3. The method of claim 2, wherein carrying out the steering position control operation includes filtering out at least one of the natural frequencies of the steering wheel arrangement.

4. The method of claim 1, wherein prespecifying the electromotive steering intervention includes prespecifying elastic tensioning of the steering wheel arrangement based on the measured or determined steering intervention force or the measured or determined steering intervention torque.

5. The method of claim 4, wherein prespecifying the electromotive steering intervention is based on a corresponding profile of the steering wheel torque measured by a manual steering torque sensor disposed on the steering wheel arrangement.

6. The method of claim 1, wherein prespecifying the electromotive steering intervention includes prespecifying a step profile of the steering intervention force or of the steering intervention torque or a periodic oscillation of the steering intervention force or of the steering intervention torque.

7. The method of claim 1, wherein ascertaining the natural frequency includes providing excitation with sinusoidal steering interventions at different excitation frequencies and selecting as the natural frequency that excitation frequency at which a ratio of a movement amplitude on the steering wheel to a movement amplitude on a pinion of the steering wheel system is at a maximum value.

8. The method of claim 1, wherein ascertaining the moment of inertia of the steering wheel arrangement includes determining the moment of inertia based on a torque introduced by the steering intervention on the steering wheel arrangement and a resulting angular acceleration of the steering wheel arrangement.

9. The method of claim 8, wherein ascertaining the natural frequency and/or the moment of inertia includes introducing as the steering intervention a sinusoidal excitation or a step excitation.

10. The method of claim 1, wherein ascertaining that the steering wheel arrangement is not being acted on by the driver includes ascertaining that a torque balance is being created at the steering wheel arrangement and that there is no differential torque.

11. The method of claim 1, wherein operating the transportation vehicle comprises providing a driver assistance by providing a steering intervention, or an autonomous driving function, which provides for automatic steering.

12. A steering system of a transportation vehicle, the steering system comprising:
a steering wheel arrangement; and
an apparatus for enabling operation of the steering system based on a natural frequency and/or a moment of inertia of the steering wheel arrangement, wherein the apparatus is configured to
prespecify an electromotive steering intervention to control the steering system by applying a steering intervention force or a steering intervention torque,
ascertain, in response to ascertaining that the steering wheel arrangement is not being acted on by a driver, a natural frequency and/or a moment of inertia of the steering wheel arrangement based on the response of the steering wheel arrangement to the prespecified electromotive steering intervention, and
operate the transportation vehicle by adapting a control parameter of a steering position control operation applied to the steering system based on the ascertained natural frequency and/or the ascertained moment of inertia of the steering wheel arrangement, wherein the adapted control parameter is defined to prevent vibration of the steering wheel arrangement.

13. An apparatus for operating a transportation vehicle based on a natural frequency and/or a moment of inertia of a steering wheel arrangement in a steering system of the transportation vehicle, the apparatus being configured to:
prespecify an electromotive steering intervention to control the steering system by applying a steering intervention force or a steering intervention torque to the steering system;

ascertain, in response to ascertaining that the steering wheel arrangement is not being acted on by a driver, a natural frequency and/or a moment of inertia of the steering wheel arrangement based on a response of the steering wheel arrangement to the prespecified electromotive steering intervention; and operate the transportation vehicle by adapting a control parameter of a steering position control operation applied to the steering system based on the ascertained natural frequency and/or the ascertained moment of inertia of the steering wheel arrangement, wherein the adapted control parameter is defined to prevent vibration of the steering wheel arrangement.

14. The apparatus of claim 13, wherein a value of the adapted control parameter or the plurality of adapted control parameters is/are associated with, within a lookup table, a corresponding value of the ascertained natural frequency and/or the moment of inertia, or wherein the value of the adapted control parameter or the plurality of adapted control parameters is/are ascertained based on the corresponding value of the natural frequency and/or the moment of inertia.

15. The apparatus of claim 14, wherein to carry out the steering positon control operation includes to filter out at least one of the natural frequencies of the steering wheel arrangement.

16. The apparatus of claim 15, wherein to prespecify the electromotive steering intervention includes to prespecify elastic tensioning of the steering wheel arrangement based on the measured or determined steering intervention force or the measured or determined steering intervention torque.

17. The apparatus of claim 16, wherein to prespecify torque electromotive steering intervention is based on a corresponding profile of the steering wheel torque measured by a manual steering torque sensor disposed on the steering wheel arrangement.

18. The apparatus of claim 13, wherein to prespecify the electromotive steering intervention includes to prespecify a step profile of the steering intervention force or of the steering intervention torque or a periodic oscillation of the steering intervention force or of the steering intervention torque.

19. The apparatus of claim 13, wherein to ascertain the natural frequency includes to provide excitation with sinusoidal steering interventions at different excitation frequencies and select as the natural frequency that excitation frequency at which a ratio of a movement amplitude on the steering wheel to a movement amplitude on a pinion of the steering system is at a maximum value.

20. The apparatus of claim 13, wherein to ascertain the moment of inertia of the steering wheel arrangement includes to determine the moment of inertia based on a torque introduced by the steering intervention on the steering wheel arrangement and a resulting angular acceleration of the steering wheel arrangement.

21. The apparatus of claim 20, wherein to ascertain the natural frequency and/or the moment of inertia is based on a sinusoidal excitation or a step excitation introduced as the steering intervention.

22. The apparatus of claim 13, wherein to ascertain that the steering wheel arrangement is not being acted on by the driver includes to ascertain that a torque balance is being created at the steering wheel arrangement and that there is no differential torque.

23. The apparatus of claim 13, wherein to operate the transportation vehicle comprises to provide a driver assistance by providing a steering intervention, or an autonomous driving function, which provides for automatic steering.

* * * * *